Dec. 29, 1964 M. W. KRUEGER 3,163,434
TRUCK TANK

Filed March 14, 1961 4 Sheets-Sheet 1

INVENTOR.
MELVIN W. KRUEGER
BY
ANDRUS & STARKE
Attorneys

Dec. 29, 1964   M. W. KRUEGER   3,163,434
TRUCK TANK
Filed March 14, 1961   4 Sheets-Sheet 2

*INVENTOR.*
MELVIN W. KRUEGER
BY
ANDRUS & STARKE
Attorneys

Dec. 29, 1964　　　　M. W. KRUEGER　　　　3,163,434
TRUCK TANK

Filed March 14, 1961　　　　　　　　　　　　4 Sheets-Sheet 3

INVENTOR.
MELVIN W. KRUEGER
BY
ANDRUS & STARKE
Attorneys

Dec. 29, 1964  M. W. KRUEGER  3,163,434
TRUCK TANK

Filed March 14, 1961  4 Sheets-Sheet 4

INVENTOR.
MELVIN W. KRUEGER
BY
ANDRUS & STARKE
Attorneys

United States Patent Office 3,163,434
Patented Dec. 29, 1964

3,163,434
TRUCK TANK
Melvin W. Krueger, Madison, Wis., assignor to Dairy Equipment Company, Madison, Wis., a corporation of Wisconsin
Filed Mar. 14, 1961, Ser. No. 95,578
26 Claims. (Cl. 280—5)

This invention relates to a tank construction and more particularly to a reinforced plastic truck tank.

In the milk industry, bulk milk is transported in truck tanks which generally include an inner stainless steel tank to contain the milk and an outer shell which is formed of either stainless steel or some other metal. Recently there has been increased activity in developing lighter weight truck tanks in order to increase the payload of the truck. As the axle weight is limited, by reducing the deadload of the tank structure, an increased payload can be achieved while still maintaining the axle weight requirements.

To reduce the dead-load weight of the tank truck, the tank units have been constructed with an outer shell of reinforced plastic and an inner stainless steel tank and the area between the shell and the tank is filled with lightweight core material, such as balsa wood or cork, which serves to insulate the tank. However, wood-base core materials such as this will absorb moisture, and the moisture not only increases the weight and reduces the insulating effectiveness of the core material, but will, over an extended period, cause mildewing and decomposition.

The present invention is directed to an improved tank truck construction including a reinforced plastic outer shell and an inner stainless steel tank which are supported by a separate reinforced plastic saddle attached to the frame of the truck. A layer of foam plastic is disposed between the tank and shell and also between the tank and the supporting saddle.

The foam plastic serves to bond the tank, saddle and shell together as an integral one-piece unit which is substantially stronger than assembled all-metal tank bodies. Furthermore, the foam plastic will not absorb moisture as will other core materials such as cork or balsa wood, and the heat conductivity of the foam plastic is approximately one-half that of cork or balsa wood, thereby providing a greater degree of insulation for the milk contained within the tank. The foam plastic is a lightweight cellular material which substantially reduces the overall weight of the tank body and thereby correspondingly increases the quantity of milk or other material which can be transported in the truck tank.

In the present construction, the shell can be built to the full width of the state vehicle code requirements with the ladder catwalks being recessed within the side walls of the shell. By utilizing this width, the height and center of gravity of the inner tank is lower, which results in better roadability and handling of the truck.

Other objects and advantages will appear in the course of the following description.

The drawings illustrate the best mode presently contemplated of carrying out the invention.

The drawings illustrate a truck tank for hauling milk or other material which comprises a cab 1 and a chassis 2 which supports a tank body 3.

The body 3 includes an inner tank 4 adapted to contain the milk or other liquid and which is surrounded by an outer reinforced plastic shell 5. The tank 4 and shell 5 are supported on a reinforced plastic saddle 6 which is secured to the side rails 7 of the chassis 2 of the truck.

The shell 5 is generally rectangular in shape and includes a pair of side walls 8 which are connected at their vertical side edges by a front wall 9 and a rear wall 10. A top wall 11 connects the upper edges of the side walls and front and rear walls to provide an integral, generally rectangular shell.

An internal partition 12 extends transversely of the shell 5 with the side edges of the partition 12 being secured to the side walls 8 and the upper edge of the partition 12 being secured to the top wall 11. In addition, a horizontal partition 13 is secured between the partition 12 and the rear wall 10. The partitions 12 and 13 and the side walls 8 define a rear chamber 14, and the rear wall 10 is provided with a large opening 15 which communicates with the chamber 14.

The side walls 8 are provided with arcuate cutouts 16 which receive the wheels of the truck. The lower edge of the front wall 9 is provided with a cutout portion 17 to receive the chassis, while the lower edge of the rear wall 10 is provided with a notched portion 18 which receives the bumper brackets 19 connecting the bumper 20 to the frame of the truck chassis.

The shell 5 and the partitions 12 and 13 are all formed of reinforced thermosetting resin. The resin or plastic material to be usesd can be any of the conventional thermosetting resins, such as polyester, epoxy, silicone, and the like. The reinforcement for the resin may be mineral or ceramic fibers, such as glass or asbestos, vegetable or animal fibers, synthetic fibers and the like. In addition, metal reinforcement, such as wire, can also be employed as the reinforcement for the resin. The reinforcing material may be in the form of chopped short fibers, matting, woven fabric, unidirectional fibrous strands, netting and the like. The reinforcing materials, impregnated with resin, are molded by conventional molding procedures to provide the shell 5 and the partitions 12 and 13. The partitions are generally formed separately from the shell and are subsequently bonded to the shell with additional coats of resin and reinforcing fibers.

Figure 6:
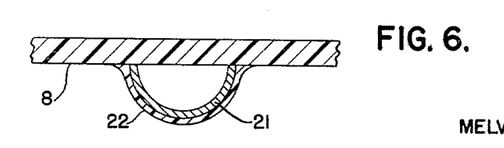
FIG. 6 is an enlarged transverse section taken along line 6—6 of FIG. 5 and showing one of the reinforcing ribs.

To provide additional reinforcement for the shell and partition 12, a series of elongated members 21 are embedded within the walls of the shell 5 and partition 12 and form internal ribs 22. As best shown in FIG. 6, the members 21 are generally semi-circular in cross section and are formed of plastic, cardboard, metal mesh or the like. The hollow interior of the members 21 may be filled with a lightweight core material such as foam plastic, if desired. The members 21 are applied to the inner surface of the shell 5 and partition 12 and additional quantities of fibrous reinforcement and resin are applied over the members to embed the members within the wall. While the members 21 are shown as having a semi-circular cross section, the members may have any desired cross sectional shape which will serve as a form for the ribs 22.

Each of the side walls 8 of shell 5 is provided with a horizontal recess 23 which receives a trim strip 24 made of stainless steel or the like. In the completed body, the outer surface of the trim strip extends outwardly a slight distance beyond the side wall 8 and serves as a rub rail.

In addition, the side walls 8 are each provided with a toe recess 25 which extends vertically along the side wall at the rear end of the recess 23. A series of rungs 26 are disposed in aligned openings in the side walls 27 of recess 25, and vertical rods 28 are secured within aligned holes in the ends of the rungs and prevent rotation and displacement of the rungs.

The forward side wall 27 of each recess 25 is disposed in engagement with the corresponding side edge 29 portion of the partition 12 and serves to reinforce the same.

The shell 5 is also provided with a central opening 30 in the top wall 11 which is adapted to be enclosed by a cover assembly 31.

Figure 1:
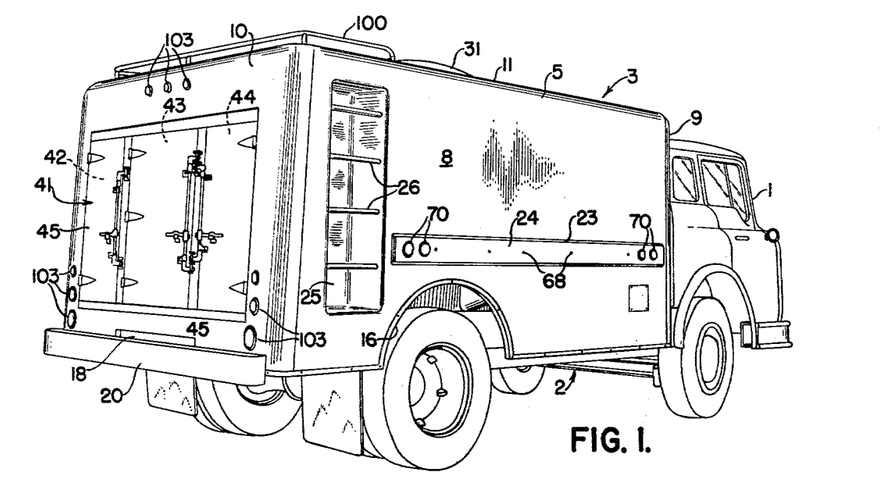
FIGURE 1 is a perspective view of the truck tank of the invention.
Figures 2, 3:
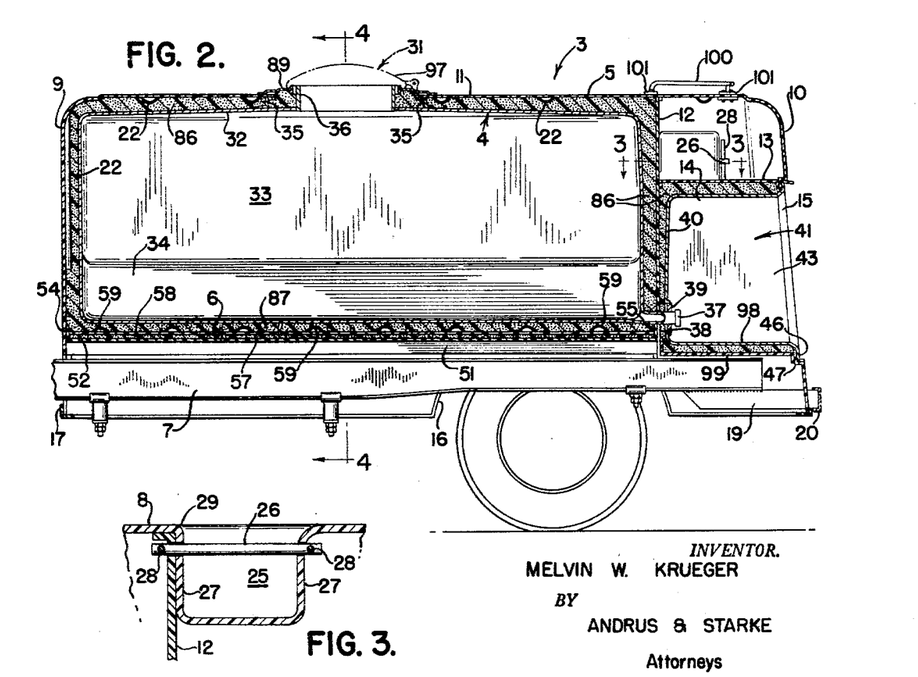
FIG. 2 is a longitudinal section taken through the truck tank.
FIG. 3 is a horizontal section taken along line 3—3 of FIG. 2.
Figure 4:
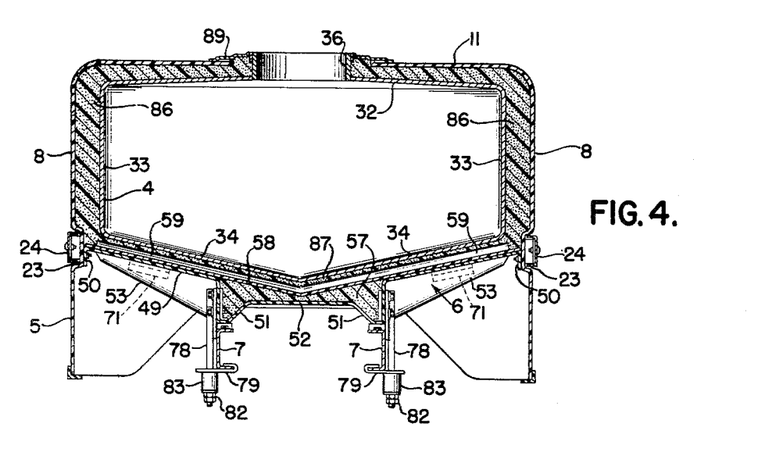
FIG. 4 is a transverse section of the body taken along line 4—4 of FIG. 2.
Figure 5:
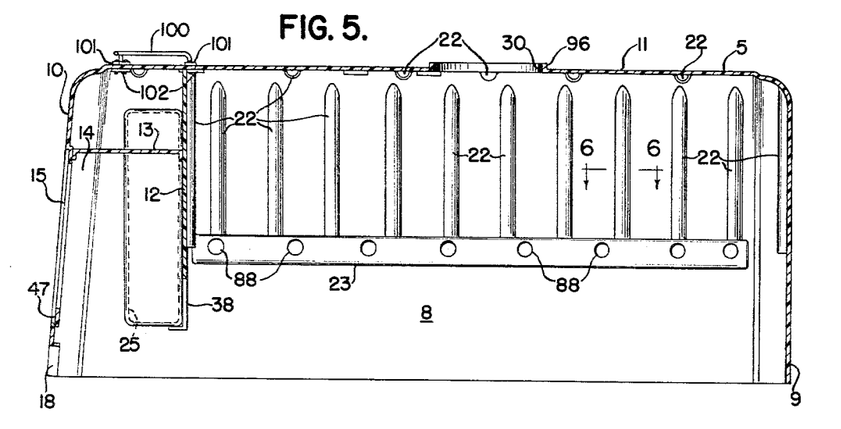
FIG. 5 is a longitudinal section of the outer shell.

Tank 4, which is adapted to contain the milk or other material to be transported, is formed of stainless steel or other corrosion resistant material. As best shown in FIGS. 2 and 4, the tank 4 includes a generally flat top wall 32 and a pair of side walls 33 which are disposed generally normal to the top wall 32. The tank 4 is provided with a pair of sloping bottom walls 34 which are connected to the side walls and diverge downwardly toward the longitudinal center of the tank.

The upper surface 32 of the tank 4 is spaced from the top wall 11 of the shell 5 by a pair of Z-bars 35 which are disposed in spaced relation and transversely of the tank.

To provide access to the tank, a manhole 36 is formed in the upper surface 42 and is disposed in alignment with the opening 30 in the shell 5. The contents of the tank are withdrawn through a drain pipe 37 which is connected to the lower portion of the tank 4 and extends rearwardly through a notch 38 in the lower edge of the partition 12. A flange 39 is secured to the outer end portion of the drain pipe 37 and the flange is adapted to be welded to the forward wall 40 of a compartment unit 41 which is located within the chamber 14. The compartment unit 41 defines three separate compartments 42, 43 and 44 with the compartment 42 being a sample compartment, the compartment 43 serving to house the pumping equipment and the compartment 44 containing the motor and cord reel. In some cases a pair of compartments may be utilized rather than three compartments, and in other cases, a single compartment.

Each of the compartments 42, 43 and 44 is enclosed by a door 45.

The compartment unit 41 is mounted within the chamber 14 by the attachment of the peripheral flange 46 on the compartment to the flange 47 formed in the end wall 10 bordering the opening 15.

The saddle 6 comprises a base section 48 having a pair of inwardly and downwardly sloping walls 49 which terminate at their outer extremities in downwardly extending side flanges 50. The base section 48 also includes a pair of spaced, longitudinally extending ribs 51 and a flat, central surface 52 which connects the ribs.

To provide additional stiffness for the base section, a plurality of outrigger ribs 53 are formed in the base walls 49 and the outrigger ribs 53 extend laterally from the ribs 51 outwardly to adjacent the flanges 50.

The front of the saddle is enclosed by an end wall 54 while the rear end of the saddle is enclosed by a similar end wall 55. The base section 48, end walls 54 and 55 are all formed of fiber-reinforced plastic similar to shell 5 and the end walls are formed integrally with the base section.

Figure 11:
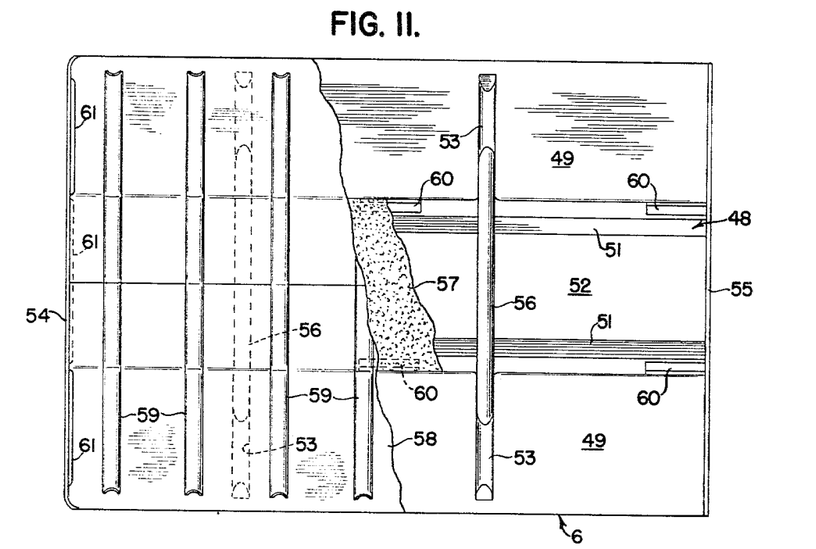
FIG. 11 is a top elevation of the saddle with parts broken away.
Figure 12:
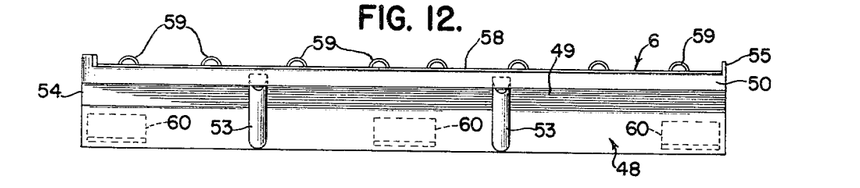
FIG. 12 is a side elevation of the saddle.
Figure 13:
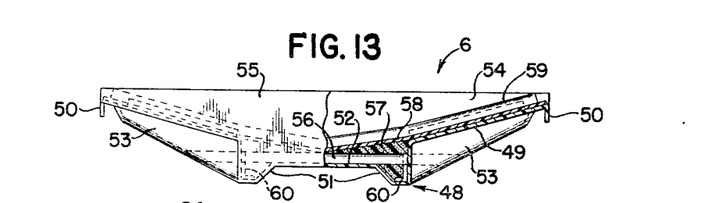
FIG. 13 is an end view of the saddle with parts broken away.

To provide added rigidity, each laterally aligned pair of outrigger ribs 53 is tied together by a stiffener 56 which extends within the aligned outrigger ribs and rests on the central surface 52. The stiffener is formed of plastic, cardboard, metal mesh or the like, and is similar in shape and function to members 21. The stiffeners 56 are positioned on base section 48 and additional quantities of fibrous reinforcement and resin are applied over the stiffeners to secure the stiffeners to the outrigger ribs 53 and surface 52. As best shown in FIGS. 4 and 11, the space within the outrigger ribs 53 and area within the longitudinal ribs 51 and above the central surface 52 is filled with foam plastic 57 and the upper surface of the foam plastic layer 57 is molded to complement the lower surface of the tank 4. An upper layer of reinforced plastic 58 is disposed over and is bonded to the walls 49 and the foam plastic layer 57.

Additional rigidity is provided for the saddle by a plurality of stiffening members 59 which are secured to the upper surface of the top layer 58 and extend laterally of the saddle. The stiffening members 59 are similar in construction to stiffening members 21 and are secured to the layer 58 by an additional layer of fibrous material and resin which is applied over the stiffeners 59 and serves to integrally bond the stiffeners to the layer 58.

Figure 7:
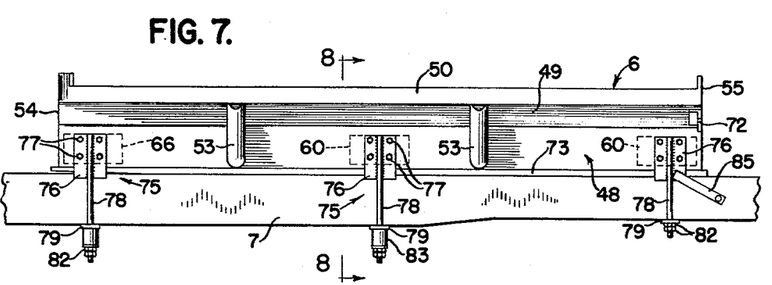
FIG. 7 is an enlarged side elevation showing the attachment of the saddle to the truck frame.

In order to provide an anchor for the attachment of the saddle to the side rails 7 of the frame, a series of generally L-shaped plates 60 are disposed within the ribs 51 and bonded thereto, as best shown in FIG. 7. Similarly, a series of end backup plates 61 are embedded within the end wall 54 and serve as reinforcing members for attachment of the saddle to the shell.

Figures 8, 9, 10:
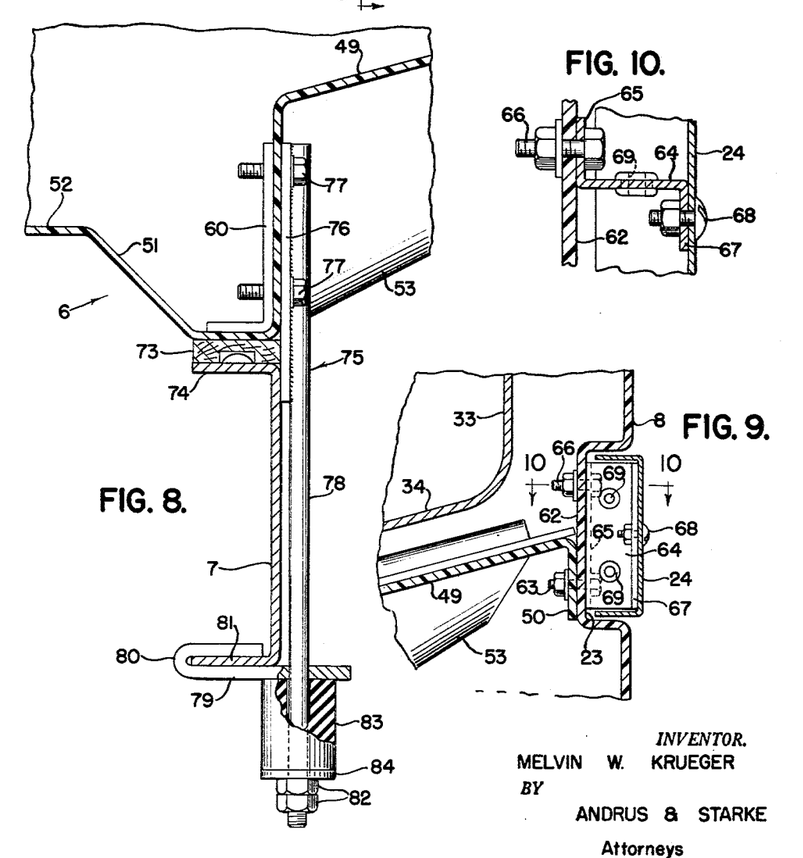
FIG. 8 is an enlarged transverse section taken along line 8—8 of FIG. 7.
FIG. 9 is an enlarged transverse section showing the attachment of the saddle to the shell.
FIG. 10 is a horizontal section taken along line 10—10 of FIG. 9.

To attach the shell 5 to the saddle 6, the flanges 50 of the saddle are connected to the inner vertical wall 62 of recess 23 by bolts 63, as shown in FIG. 9. The trim strip 24 is secured within the recess 23 by a series of spaced Z-shaped brackets 64 having one leg 65 secured flatwise to wall 62 by bolts 66 and the other leg 67 attached to strip 24 by bolts 68. Each of the brackets is provided with a pair of openings 69 to receive the electrical conduit for the lights 70 which are secured to the strip 24.

Additional attachment is provided between the saddle and the shell at the ends of the unit by a pair of generally L-shaped reinforced plastic brackets 71 and 72. The horizontal legs of brackets 71 are bonded to the underside of the walls 49 of saddle 6 while the vertical legs of the bracket 71 are bonded to the end wall 54. Similarly, the horizontal legs of brackets 72 are bonded to walls 49 and the vertical legs are bonded to rear end wall 55.

The saddle 6 and the shell 5 are supported on the side rails 7 of the chassis of the truck. As best shown in FIG. 8, a wooden block 73 is disposed on the upper flange 74 of each of the side rails 7 and a plurality of clamping members 75 are employed to clamp the ribs 51 of the saddle to the respective side rails 7.

The clamps 75 include an upper plate 76 which is secured to plates 60 by bolts 77. A vertical stud 78 is welded to each plate 76, and the lower end of the stud passes through an opening in a frame clip 79. The clip 79 is provided with a bent edge 80 which engages the lower flange 81 of the side rail. The lower end of each stud 78 receives a pair of nuts 82 and a rubber pad 83 is disposed around the two forward studs and extends between the clip 79 and a washer 84. Turning nut 82 down on the stud 78 will firmly secure the saddle 6 to the side rail while the rubber pad 83 provides resiliency for the attachment. The stud 78 associated with the rearmost clip does not include a pad 83, but instead is firmly secured to the frame. Forward and rearward movement of the tank body with respect to the frame is prevented by a bracket 85 which connects the rearmost plates 76 with the side rails 7.

The area between the shell 5 and the tank and the area between the compartment unit 41 and the walls 12 and 13 are filled with a foam plastic material 86 which is bonded to the members and serves to connect the members together as an integral unit. The foam plastic is a closed cell cellular foam material such as polyurethane, polyvinylchloride, polyethylene, polyester blends, and the like. The plastic foam 86 has a density generally in the range of about 2.0 to 2.5 pounds per cubic foot and serves not only to connect the tank and the shell together as an integral unit, but provides an excellent insulation for the liquid contained within the tank. The foam plastic is lightweight high-strength material and will not absorb moisture so that there is no danger of decomposition or mildew of the core material. The use of polyurethane resin has proven very satisfactory and this resin is prepared by reacting a polyester of adipic acid and ethylene or propylene glycol, esterified and polymerized to a molecular weight of approximately 2000, with a di-isocyanate. The resin is preferably blown with a gas, such as Freon 11, which produces a more uniform closed cell structure.

In order to properly space the side walls 8 of the shell from the tank 4, tool hangers or other mechanical spacing members are temporarily positioned between the shell and tank while introducing the foam therebetween.

In addition to the foam plastic material 86 between the tank and the shell, foam plastic material is also disposed between the saddle and the tank, as indicated by 87. The foam plastic 87 is similar to the foam plastic 86 and is introduced into the area between the saddle and the tank through a series of openings 88 formed in the side walls 8 in the area defining the recesses 23.

Figure 14:
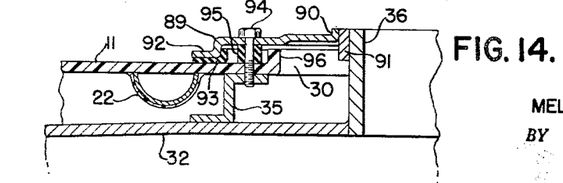
FIG. 14 is a sectional view showing the attachment of the deck plate to the tank and to the shell.

The cover assembly 31, which encloses the manhole 36 in the tank, includes a deck plate 89 having an upwardly extending flange 90 which extends around the central opening in the deck plate, and the flange 90 is welded to the upstanding flange 91 bordering the manhole 36 in the tank 4. As best shown in FIG. 14, the deck plate 89 is also provided with an outer flange 92 which is spaced from the upper surface of the shell 5 by a resilient gasket 93. The deck plate is secured to the shell 5 by a series of bolts 94 which extend through aligned openings in the deck plate, shell and in the Z-bars 35. A rubber spacer 95 is disposed around the bolts and extends between the deck plate and the shell 5.

To prevent inward leakage of foreign material or moisture into the area between the shell 5 and tank 4, the edge of the shell 5 bordering the opening 15 is provided with an upturned flange 96.

A conventional cover 97 is hinged to the deck plate 89 and serves to enclose the manhole in the tank.

A layer of foam plastic 98, similar in nature to foam plastic 86, is located beneath the lower wall of the compartment unit 41 and the under surface of the layer 98 is enclosed by a layer of reinforced plastic 99 having end flanges which are bonded to the end wall 10 and partition 12.

A U-shaped railing 100 is secured to the top wall 11 of the shell. The railing 100 is provided with a series of feet 101 which rest on the top wall 11 and are connected by bolts to support plates 102 embedded within the top wall.

In addition to lights 70 in trim strip 24, a series of lights 103 are positioned in the end wall 10 of the shell.

In fabricating the truck tank, the shell, including the side walls, end and rear walls and top, is formed as an integral unit in a single molding operation. In forming the shell, inserts are initially located in the inverted mold to provide the toe recesses 25 and the horizontal recesses 23 in the side walls 8 of the shell. After placement of the inserts, all of the sharp corners within the mold are filleted with wax, clay or the like, and the entire inner surface of the mold is then coated with a mold release or other wax-type material which will prevent the resin from sticking to the mold.

A gel coat of the liquid uncured thermosetting resin, such as a polyester resin, is then sprayed over the entire waxed surface of the mold. After curing the gel coat, alternate layers of glass cloth, impregnated with the liquid polyester resin, and chopped glass fibers impregnated with the resin are applied to the gel-coated mold to obtain the desired wall thickness. The glass cloth is laid up by hand and the liquid resin is sprayed on the cloth and worked into the cloth with rollers, while the chopped fiber-resin mixture is applied to the mold by spraying.

The reinforcing members 21 are then applied with their open sides disposed against the previously formed wall section and additional layers of glass cloth and chopped glass fibers and resin are sprayed over the reinforcing members to embed the reinforcing members within the wall section.

Similarly, the steel inserts 102 are also positioned on the top wall 11 and additional layers of cloth and chopped fibers and resin are applied over the steel inserts to embed the same within the top wall.

After the resin has cured, the partitions 12 and 13, formed in a similar manner from alternate layers of glass cloth and chopped fibers impregnated with resin, are positioned within the shell 5 and secured in place by spraying additional layers of cloth and chopped fibers and resin onto the joints.

After curing of the resin joints which secure the partitions to the shell, the shell is then stripped from the mold and the excess reinforced resin is trimmed. The wheel cutouts and notches 16, 17 and 18 are provided in the walls of the shell and the filler holes 88 are also cut at this time.

To form the saddle 6, the mold surface of the metal mold is initially coated with a mold release material such as wax. A gel coat of polyester resin or the like is then applied to the waxed surface and cured, and glass fiber cloth is laid up on the mold surface and impregnated with the liquid uncured resin. After application of the glass cloth, a layer of chopped glass fibers and resin is sprayed over the glass cloth and subsequently, successive alternate layers of glass cloth and chopped fibers coated with resin are applied to form the base section 48 and end walls 54 and 55 with the desired thickness.

The stiffener members 56 are then positioned within the aligned outrigger ribs 53 and bonded to the base section 48 by additional layers of cloth and chopped fibers impregnated with resin. In a similar manner, the plates 60 and 61 are applied to the ribs 51 and end wall 54, respectively, and secured thereto by additional layers of cloth and chopped fibers coated with resin which are applied over the plates.

The resin is then cured to provide an integral unit including the base section 48, end walls 54 and 55, stiffeners 56 and the embedded plates 60 and 61.

The entire upper surface of the base section 48 and end walls 52 and 53 are then coated with an uncured liquid epoxy resin. After curing of the epoxy resin, a liquid plastic foam, such as polyurethane foam, is poured into the ribs 51 and outrigger ribs 53 and between the stiffeners 56. A male die, not shown, is lowered into the mold and provides the shallow V-shaped upper surface for the foam layer 57.

After curing of the foam, additional layers of chopped fibers and cloth impregnated with resin are applied to the upper surface of the foam 57 to provide the upper layer 58. The semi-cylindrical reinforcing members 59 are then applied at intervals along the length of the saddle and secured to the layer 58 by additional layers of cloth, chopped fibers and resin.

To assemble the truck tank, the molded shell 5 is inverted and all the electrical wiring for the lights 70 and 103 is then installed within the shell. The ladder rungs 26 are also positioned within the side walls 27 of the recesses 25 and secured therein by the rods 28. The inner surface of the shell is then coated with a liquid epoxy resin and the stainless steel tank 4 and the rear compartment unit 41 are coated with a liquid epoxy resin and are positioned within the shell. After curing of the epoxy resin, the tank 4 and compartment unit are inserted into the inverted shell, and the flange 39 on drain pipe 37 is welded to the compartment wall 40 and the flange 46 of the compartment unit 41 is bolted to the shell flange 47. The tank at this time is supported within the inverted shell by the Z-bars 35 and the welded flange 39.

After positioning of the tank and the rear compartment unit, tank 4 is pressurized with air or other gas to prevent collapse of the tank during the subsequent foaming operation. Generally, internal pressure in the range of ¼ to ⅓ p.s.ig. is employed. The polyurethane foam is then poured in the area between the tank and the shell and between the partition and the tank up to about the level of the recesses 23. The foam is also poured between the compartment unit 41 and the shell 5 and the partition 12.

The liquid resin runs downwardly between the shell and tank and then inwardly between the upper surface of the inverted tank and the top wall 11 of the shell. After the resin has foamed and expanded upwardly to the level of the bottom of the tank and has been cured, the excess foam is then trimmed off and a layer of uncured epoxy resin is applied to the bottom of the tank, which at this time is facing upwardly, and to the upper surface of the saddle. The saddle is then inverted and lowered into the shell and secured to the shell by means of the brackets 64 and bolts 66 and 68.

Further attachment is provided by bolts which are inserted through aligned openings in forward wall 9 of the shell and plates 61. After the bolted attachment, layers of glass cloth and chopped fibers impregnated with resin are applied to the joints between walls 49 of the saddle and corresponding end walls 54 and 55 to provide the brackets 71 and 72.

While the truck tank is still in the inverted position, liquid polyurethane resin is applied to the lower surface of the compartment unit 41, which at this time is facing upwardly, to form the foam layer 98. After curing of the foam resin layer 98, additional layers of glass cloth and chopped glass fibers are applied to the exposed surface of the layer 98 to provide the outer layer 99.

The truck tank assembly is then righted and liquid polyurethane resin is then poured through the filler holes 88 in the recesses 23 and into the space between the tank and the saddle. After foaming and curing of the resin, the excess resin, which is expanded through the holes 88, is trimmed and the exposed surface of the foam resin is coated with an epoxy resin to seal the same.

The deck plate 89 and the cover assembly 31 are then attached to the upper portion of the tank, the railing 100 is attached to top wall 11 and the doors 45 are then hung on the compartment unit 41 to seal off the compartments and complete the assembly. The entire truck tank unit is then attached to the side rails 7 of the truck by attachment of the clamping members 75 and brackets 85.

The truck tank of the present invention is a lightweight unit that weighs approximately 33% less than a similar all-metal tank truck. This reduction in weight produces a corresponding increase in the weight of material which can be transported by the truck.

The foam plastic, which is disposed between the inner tank and the outer reinforced plastic shell, serves as a lightweight insulating material having substantially greater insulating characteristics than balsa wood or cork, which are commonly used in truck tanks. Furthermore, the foam plastic will not absorb moisture and will not decompose or mildew after in service.

The coating or film of the cured epoxy resin serves to firmly bond the foam plastic material to the inner tank, the outer shell and the saddle. This results in a one-piece integral structure which is substantially stronger than the conventional type of truck tanks.

The shell 5 can be built to the full width of the state vehicle code requirements rather than being narrower than the chassis and this increased width lowers the center of gravity for the entire truck.

The recesses 24, which extend horizontally along the side walls, provide a multiple function in that they serve as a conduit for the electrical connections to the lights 70, serve to house the Z-brackets 64 which connect the shell to the saddle, and also contain the filler holes 88 through which the foam plastic is introduced to fill the area between the tank 4 and the saddle 6. The trim strips 24 enclose the recesses 23 in the final assembly and provide an attractive appearance, as well as serving as rub rails to prevent damage or scratching of the shell.

Various modes of carrying out the invention are contemplated as being within the scope of the following claims particularly pointing out and distinctly claiming the subject matter which is regarded as the invention.

I claim:

1. A truck tank construction, comprising an outer shell having a pair of end walls and a pair of side walls connected to the end walls and having a top wall and an open bottom, a partition wall extending downwardly from the top wall and disposed transversely within the shell and dividing the interior of the shell into a forward chamber and a rear chamber, a tank disposed within the forward chamber and spaced from the walls of the shell and from said partition, a compartment unit disposed within the rear chamber and spaced from the walls of the shell and from the partition, said compartment unit defining at least one closed compartment, conduit means connecting the tank with said compartment, and a layer of foam plastic disposed between the shell and the tank, between the tank and the partition, and between the compartment unit and the partition to provide a lightweight insulated structure.

2. The structure of claim 1 in which the foam plastic is of the closed-cell type to prevent absorption of moisture by said foam plastic.

3. The structure of claim 1, and including a coating of a cured epoxy resin disposed between the foam plastic layers and the shell, the tank and the compartment unit to thereby firmly bond the foam plastic to said shell, tank and compartment unit.

4. A truck tank construction, comprising an inner tank adapted to contain a material to be transported, an outer shell disposed around the inner tank and having a substantially vertical wall and having a recess formed in the wall and extending substantially horizontally, said recess including a surface disposed out of the plane of said wall of the shell, a saddle to support the tank and having a surface disposed generally flatwise to said first-named surface, means for connecting said surfaces together to thereby mount the shell on the saddle, and a layer of foam plastic material disposed between the lower surface of the tank and the saddle to serve as a support for the tank.

5. The structure of claim 4, and including a trim strip removably disposed in said recess and having an outer surface projecting outwardly beyond said wall of the shell to provide a rub rail.

6. A truck tank construction, comprising a truck chassis, a saddle supported on the chassis, an inner tank adapted to contain a material to be transported and spaced above the saddle, an outer shell disposed around the tank and including a pair of side walls extending substantially vertically to a level beneath said saddle, each of said side walls being provided with a substantially horizontal recess with said recess defining an offset surface disposed substantially parallel to the plane of the respective side wall, said saddle including a portion disposed generally flatwise to the offset surface of each recess, a series of connecting members disposed within said recess and serving to connect said offset surface to said portion of the saddle, a trim strip extending substantially the length of each recess, and connecting means for securing the trim strip to the connecting members to thereby support the trim strip within the respective recess.

7. A truck tank construction, comprising a truck frame including a pair of spaced longitudinal side rails, a saddle having a pair of spaced longitudinal members extending downwardly therefrom and resting on the corresponding side rails, the upper surface of said saddle having a depression extending longitudinally of said saddle, means connecting the longitudinal members to the side rails at intervals along the length of the side rails, a lightweight reinforced plastic shell separate from the saddle and having vertical side walls extending continuously downward to a level beneath the saddle, said side walls being secured to the longitudinal side edge portions of the saddle and extending upwardly therefrom, a tank disposed within the shell and spaced above the saddle, said tank having a surface shaped to complement the upper surface of the saddle, and a layer of foam plastic material disposed between the shell and the tank and between the lower surface of the tank and the upper surface of the saddle, said foam plastic being bonded to the shell, tank and saddle to provide a lightweight integral structure.

8. The structure of claim 7, and including a series of reinforcing ribs connected to the saddle at the upper surface thereof, said ribs extending transversely of the saddle and being spaced out of contact from the lower surface of the tank.

9. A truck tank construction, comprising a frame including a pair of spaced longitudinal side rails, a saddle mounted on the side rails and having a bottom surface and having a pair of spaced longitudinal ribs extending downwardly from said surface and resting on the respective side rails and said saddle having a generally V-shaped upper surface, means for connecting the longitudinal ribs to the corresponding side rails, a lightweight shell secured to the longitudinal side edge portions of the saddle and extending upwardly therefrom, a tank disposed within the shell and spaced above the saddle, said tank having a bottom surface to complement the upper surface of the saddle, a layer of foam plastic material disposed between the shell and the tank and between the lower surface of the tank and the upper surface of the saddle, and a cured thermosetting resin disposed between the foam plastic and the contiguous surfaces of the tank, saddle and shell to securely bond the foam plastic to the respective surfaces.

10. In a truck tank construction, a metal tank having an opening therein, an outwardly extending flange connected to the tank and bordering the opening, an outer reinforced plastic shell disposed in spaced relation around the tank and having an opening in alignment with the opening in the tank to receive said flange, backing means secured to the tank and located inwardly of the shell a deck plate having an opening aligned with the opening in the tank and welded to the flange, and means for securing the peripheral portion of the deck plate to the backing means to provide an integral supporting structure for a cover for said opening in the tank.

11. The structure of claim 10, and including an outwardly extending flange connected to the shell and bordering the opening therein, said flange being spaced radially outward from the flange bordering the opening in the tank.

12. A truck tank construction, comprising an outer shell having a pair of end walls and a pair of side walls connected to the end walls and having a top wall and an open bottom, a partition wall disposed transversely within the shell and dividing the interior of the shell into a forward chamber and a rear chamber, a tank disposed within the forward chamber and spaced from the walls of the shell and from said partition, a compartment unit disposed within the rear chamber and spaced from the walls of the shell and from the partition, said compartment unit defining at least one closed compartment, a side wall of said shell having a substantially vertical recess located rearwardly of said partition and laterally of the compartment unit with said recess including an offset surface disposed substantially parallel to said side wall, said offset surface spaced laterally from said compartment unit, a series of vertically spaced rungs secured to said side wall and extending across said recess, and a layer of foam plastic resin disposed between the shell and the tank, between the tank and the partition and between the compartment unit and the partition to provide a lightweight insulated structure.

13. A truck tank construction, comprising an outer shell having a pair of end walls and a pair of side walls connected to the end walls and having a top wall and an open bottom, a partition wall disposed transversely within the shell and dividing the interior of the shell into a forward chamber and a rear chamber, a tank disposed within the forward chamber and spaced from the walls of the shell and from said partition, a compartment unit disposed within the rear chamber and spaced from the walls of the shell and from the partition, said compartment unit defining at least one closed compartment, a side wall of said shell having a substantially vertical recess located rearwardly of said partition and laterally of the compartment unit with said recess including an offset surface disposed substantially parallel to said side wall and a pair of spaced side surfaces connecting said offset surface with said side wall, a series of vertically spaced rungs disposed within aligned openings in said side surfaces and extending across said recess, means for preventing displacement of said rungs from the openings in said side surfaces, and a layer of foam plastic resin disposed between the shell and the tank, between the tank and the partition and between the compartment unit and the partition to provide a lightweight insulated structure.

14. A truck tank construction, comprising an outer shell having a pair of end walls and a pair of side walls connected to the end walls and having a top wall and an open bottom, a partition wall disposed transversely within the shell and dividing the interior of the shell into a forward chamber and a rear chamber, a tank disposed within the forward chamber and spaced from the walls of the shell and from said partition, a compartment unit disposed within the rear chamber and spaced from the walls of the shell and from the partition, said compartment unit defining at least one closed compartment, a side wall of said shell having a substantially vertical recess located rearwardly of said partition and laterally of the compartment unit with said reccess including an offset surface disposed substantially parallel to said side wall and including a side surface connecting said offset surface and said side wall, said side surface being disposed substantially flatwise to said partition and serving to reinforce said partition, a series of vertically spaced rungs secured to said side wall and extending across said recess, and a layer of foam plastic resin disposed between the shell and the tank, between the tank and the partition and between the compartment unit and the partition to provide a lightweight insulated structure.

15. The structure of claim 6, in which said connecting means comprises a series of spaced brackets disposed within said recess and removably connecting said trim strip to said offset surface.

16. A truck tank construction, comprising a frame including a pair of spaced longitudinal side rails, a saddle mounted on the side rails and having a bottom surface defining a pair of spaced longitudinal ribs extending downwardly from said surface and said bottom surface including a series of transverse depending ribs extending outwardly from said longitudinal ribs to the side edge portions of said saddle, a layer of foam plastic disposed within said longitudinal ribs and said transverse ribs, means for attaching said saddle to the side rails, a lightweight shell secured to the longitudinal side edge portions of the saddle and extending upwardly therefrom, a tank disposed within the shell and spaced above the saddle, said tank having a bottom surface to complement the upper surface of the saddle, a layer of foam plastic material disposed between the shell and the tank and between the lower surface of the tank and the upper surface of the saddle, and a cured thermosetting resin disposed between the foam plastic and the contiguous surfaces of the tank, saddle and shell to securely bond the foam plastic to the respective surfaces.

17. A truck tank construction, comprising a frame including a pair of spaced longitudinal side rails, a saddle member mounted on the side rails and defining a pair of spaced open top longitudinal ribs extending downwardly therefrom and said saddle member having side portions extending upwardly and outwardly from said longitudinal ribs, a series of spaced, open-top transverse ribs disposed in said side portions and extending outwardly from said longitudinal ribs to the edges of said side portions, a series of stiffeners extending transversely across thet longitudinal ribs and having the end portions thereof disposed within aligned pairs of said transverse ribs, a layer of foam plastic disposed in said longitudinal ribs and said transverse ribs and disposed around said stiffeners, a cover member bonded flatwise to said side portions and covering said layer of foam plastic, a lightweight shell secured to said side portions and extending upwardly therefrom, a tank disposed within the shell and spaced above said cover member, and a second layer of foam plastic disposed between the lower surface of said tank and said cover member and bonded to said tank and cover member.

18. A vehicle tank comprising an outer shell having a pair of end walls and a pair of side walls connected to the end walls and having a top wall and an open bottom, a tank disposed within the shell and spaced from the walls of the shell, at least one of said side walls of the shell having a substantially vertical recess located rearwardly of the tank, said recess extending laterally inward beyond the corresponding side wall of the tank and serving as a ladder well, and a layer of lightweight cellular material bonded to the tank and to the shell to provide a lightweight insulated structure.

19. A vehicle tank construction, comprising a vehicle chassis, a saddle supported on the chassis and including an upper surface having a central longitudinally extending depression, said saddle also including a pair of spaced longitudinal members extending downwardly from said upper surface and located on either side of the longitudinally extending depression, flange means extending vertically from each side edge of said upper surface of the saddle, an inner tank adapted to contain a material to be transported and spaced above the saddle, an outer shell disposed around the tank including a pair of side walls extending to a level beneath said saddle, said side walls being disposed flatwise against the outer surface of the respective flange means on said saddle, means for securing said flange means to the respective side wall of the shell, and a layer of lightweight insulating material located between the tank and the shell and bonded thereto and located between the tank and the saddle and bonded thereto.

20. A vehicle tank construction, comprising a vehicle chassis, a saddle supported on the chassis and including an upper surface and said saddle including a pair of longitudinal members extending downwardly from said upper surface, a flange extending downwardly from each side edge of said upper surface, a series of lateral ribs extending laterally outward from each longitudinal member toward the corresponding flange, a tank adapted to contain a material to be transported and spaced above the upper surface of the saddle, an outer shell disposed around the tank and including a pair of side walls extending downwardly to a level beneath the saddle with said side walls disposed flatwise against the corresponding flanges, means for connecting the flanges to the side walls, and a layer of cellular plastic material located in a space between the tank and the shell and located in the space between the tank and the saddle.

21. A vehicle tank construction, comprising an outer shell having a front end wall and a rear end wall and having a pair of side walls connected to the end walls and having a top wall and an open bottom, a partition wall extending downwardly from the top wall and disposed transversely within the shell and dividing the interior of the shell into a forward chamber and a rear chamber, a tank disposed within the forward chamber and spaced from the walls of the shell and from said partition, a supporting saddle spaced beneath the tank and including a generally V-shaped upper surface and having a front end surface and a rear end surface, said front end surface of the saddle being secured to the front end wall of the shell and the rear end surface of the saddle being secured to said partition wall, and a layer of lightweight insulating material disposed between the shell and the tank and between the tank and the partition and between the upper surface of the saddle and the tank.

22. In a tank truck construction, an outer shell, a partition wall disposed transversely within the shell and dividing the interior of the shell into a forward chamber and a rear chamber, a tank to contain a material to be transported and disposed within the forward chamber, said shell having a substantially vertical recess located rearwardly of said partition and extending inwardly within said rear chamber and defining a ladder well, and step means secured to the shell and extending across said recess for providing steps extending up the ladder well.

23. The structure of claim 22 in which the recess is defined by a pair of transversely extending side surfaces and a longitudinally extending surface located parallel to the side wall of the shell, and one of said surfaces being disposed flatwise against said partition to reinforce the same.

24. In a vehicle tank construction, a metal tank having an opening therein, an outwardly extending flange connected to the tank and bordering the opening, an outer reinforced plastic shell disposed in spaced relation around the tank and having an opening to receive the flange, a deck plate having an opening aligned with the opening of the tank and secured to the flange, a backing member secured to the tank and engaged with the peripheral edge of said shell bordering the opening therein, and connecting means for securing the peripheral portion of the deck plate to the backing member to provide a supporting structure for a cover for the opening in the tank.

25. In a vehicle tank construction, an inner tank adapted to contain a material to be transported, an outer shell composed of fiber reinforced thermosetting resin disposed around the inner tank and spaced outwardly therefrom, a series of hollow reinforcing ribs secured to the inner surface of the shell, a layer of lightweight insulating material disposed within the hollow interior of the ribs, and a second layer of lightweight insulating material disposed within the tank and the shell and bonded to the tank and the shell to provide an integral structure.

26. The structure of claim 25 in which the ribs having a generally U-shaped cross section with the open side of the U facing the shell.

References Cited by the Examiner
UNITED STATES PATENTS

| | | | |
|---|---|---|---|
| D. 170,969 | 12/53 | Clough. | |
| D. 177,772 | 5/56 | Stevens. | |
| 1,908,684 | 5/33 | Buchanan | 280—5 |
| 2,059,801 | 11/36 | Lindsay | 154—44 |
| 2,166,134 | 7/39 | Fitch | 280—5 |

(Other references on following page)

UNITED STATES PATENTS

| | | | |
|---|---|---|---|
| 2,237,310 | 4/41 | Norbom | 280—5 X |
| 2,470,986 | 5/49 | Jackson | 29—416 |
| 2,552,641 | 5/51 | Morrison | 220—9 |
| 2,690,987 | 10/54 | Jeffries et al. | 220—9 |
| 2,714,516 | 8/55 | Brown | 280—5 |
| 2,791,463 | 5/57 | Levitt | 105—423 X |
| 2,863,797 | 12/58 | Meyer | 154 |
| 2,882,701 | 4/59 | Nelson et al. | 62—405 |
| 2,908,943 | 10/59 | Miller | 18—59 |
| 2,962,183 | 11/60 | Rill et al. | 220—9 |
| 2,980,972 | 4/61 | Kloote et al. | 296—31 |
| 3,013,611 | 12/61 | Fisher | 18—59 |
| 3,014,611 | 12/61 | Marshall | 220—9 |

A. HARRY LEVY, *Primary Examiner.*

PHILIP ARNOLD, LEO FRIAGLIA, *Examiners.*

UNITED STATES PATENT OFFICE
CERTIFICATE OF CORRECTION

Patent No. 3,163,434                           December 29, 1964

Melvin W. Krueger

It is hereby certified that error appears in the above numbered patent requiring correction and that the said Letters Patent should read as corrected below.

Column 3, line 41, for "42" read -- 32 --; column 14, line 5, for "3,013,611" read -- 3,013,922 --.

Signed and sealed this 18th day of May 1965.

(SEAL)
Attest:

ERNEST W. SWIDER
Attesting Officer

EDWARD J. BRENNER
Commissioner of Patents